(12) United States Patent
Saenz De Ugarte Sevilla et al.

(10) Patent No.: US 9,297,364 B2
(45) Date of Patent: Mar. 29, 2016

(54) BOGIE PLATE FOR WIND TURBINE

(75) Inventors: Patrick Saenz De Ugarte Sevilla, Zamudio (Bizkaia) (ES); Jose M. Zabala Zabala, Asteasu (Guipuzcoa) (ES)

(73) Assignee: GAMESA INNOVATION & TECHNOLOGY, S.L., Sarriguren (ES)

(*) Notice: Subject to any disclaimer, the term of this patent is extended or adjusted under 35 U.S.C. 154(b) by 0 days.

(21) Appl. No.: 13/072,848

(22) Filed: Mar. 28, 2011

(65) Prior Publication Data

US 2011/0245031 A1 Oct. 6, 2011

(30) Foreign Application Priority Data

Mar. 30, 2010 (ES) .................................. 201000420

(51) Int. Cl.
*F16H 57/08* (2006.01)
*F03D 11/02* (2006.01)
*F16H 1/28* (2006.01)

(52) U.S. Cl.
CPC .............. *F03D 11/02* (2013.01); *F16H 57/082* (2013.01); *F05B 2260/40311* (2013.01); *F16H 2001/289* (2013.01); *Y02E 10/722* (2013.01)

(58) Field of Classification Search
None
See application file for complete search history.

(56) References Cited

U.S. PATENT DOCUMENTS

| 8,425,374 B2* | 4/2013 | Smook .......................... 475/348 |
| 2007/0238575 A1* | 10/2007 | Wang et al. .................... 475/331 |
| 2009/0163316 A1* | 6/2009 | Saenz De Ugarte et al. . 475/348 |
| 2009/0170655 A1* | 7/2009 | Seanz De Ugarte et al. . 475/331 |

FOREIGN PATENT DOCUMENTS

EP 2 072 863 A1 6/2009

* cited by examiner

*Primary Examiner* — Erin D Bishop
(74) *Attorney, Agent, or Firm* — Ladas & Parry LLP

(57) ABSTRACT

Bogie plate (10) integrated or fastened to the planetary carrier (9) of a planetary gearbox (4) for a wind turbine (1), which, using a locking element (12) prevents faults in the gearbox (4), at moments of low torque, in which there is a grinding of the housing (13) of the planetary shaft (11) around a shaft perpendicular to the bogie plate (10).

5 Claims, 5 Drawing Sheets

BOGIE PLATE FOR WIND TURBINE

OBJECT OF THE INVENTION

The present invention is related to a planetary type gearbox for a wind turbine, in particular, with a bogie plate integrated or fastened to the planetary carrier of this gearbox.

BACKGROUND OF THE INVENTION

There is a known and ever-growing tendency in wind turbine technology towards increasing the size of its machinery. Consequently, this tendency is paired up with attempts to reduce the elevated weight of the components involved, since less weight is equivalent to less stress and load on the structure, which further translates to a reduction in operational costs.

In the latest versions in wind turbine design, ongoing efforts are being made to integrate all the components constituting a wind turbine into one compact design so that the rotor hub is directly connected to the gearbox's input shaft and gearbox bearings support the rotor hub, or, contrariwise, the rotor hub bearings support the gearbox entrance shaft.

Assembly of the wind turbine transmission comprises the rotor hub, the wind turbine nacelle as supporting means and the planetary type gearbox having at least one sun wheel, around which rotate one or more planets engaging in a ring wheel, supported by a planetary carrier rotating in relation to the central sun wheel.

A problem nevertheless arises with this type of design in that the forces and deformations of the rotor hub directly affect the gearbox, since the rotor hub and the gearbox input shaft, in this type of design, call for a rigid connection. These deformations imposed on the gearbox necessarily imply planetary gearbox stage misalignments, which are almost always the causes behind internal faults in gearboxes.

One known solution to solve these deformation problems is the use of a bogie plate on the gearbox's planetary carrier. The bogie plate comprises several housings equipped with planet shafts, so that on both sides of the bogie plate, in each planet shaft, planets can be mounted, installed together with the pertinent bearings. These planetary carrier equipped with a bogie plate absorb certain misalignments, keeping them from affecting the gears in the gearbox.

There are known solutions incorporating a bogie plate coupled to the planetary carrier with fastening elements, however, these solutions, on the one hand, call for complex assembly operations that imply spending a substantial length of time and require highly strengthened materials, thus making them expensive, and, on the other hand, require continuous maintenance and monitoring, since the joint behavior cannot be determined with certainty in the long term.

Other solutions are known to integrate, as a single piece, the bogie plate together with the planetary carrier, as shown in patent EP2072863 filled by the same applicant, which solves the inconveniences of the bolted joints between the bogie plate and the planetary carrier.

Notwithstanding the above, both in the solution of the bogie plate fastened to the planetary carrier as well as the solution of the bogie plate and planetary carrier in a single piece, when there is little torque in the gearbox due to the reduced friction between the shaft on which the planets are mounted (hereinafter known as the planetary shaft) and the bogie plate housing, and likewise due to reduced friction in the planetary bearings, a rotating planet produces a planetary shaft rotation relative to the bogie plate housing.

This translates into a grinding of the housing walls, consequently filling the gears with shavings and increasing the tension between teeth from the entrapment of these shavings, which, as a result, causes a gearbox fault.

This problem is further intensified when the planetary bearings are pre-loaded, since its resistance to rotation would be higher and require an elevated level of load to overcome this effect.

Given that there are moments of little torque, i.e., having reduced load, often during the life of a wind turbine, for instance, when there is no wind, when disconnected from the grid, during start-up or when gathering speed, a solution to this problematic situation is necessary.

DESCRIPTION OF THE INVENTION

The present invention intends to solve the inconveniences as regards incorporating a bogie plate to a planetary carrier of a planetary stage gearbox to offset the effects of the loads and tensions from the wind turbine's rotor hub and, likewise, to keep the planetary shaft from rotating on its own housing when the torque is very low.

Since rotor deformations are caused by wind, these could occur in any orientation and direction, thus the planetary shaft must be capable of self-alignment by rotations on the two axes coplanar with the plane of the bogie plate, so that it absorbs these deformations.

An object of the invention is to have the planetary shaft kept from turning around an axis perpendicular to the bogie plate (hence collinear with the planetary shaft) and absolutely free to rotate on the other two axes perpendicular to the previous one.

Another object of the invention is to have a locking element in the planetary shaft so as to impede its rotation on the axis perpendicular to the bogie plate.

Another object of the invention has the locking element capable of releasing the planetary shaft to freely rotate on the two axes coplanar with the bogie plate plane for unrestricted self-alignment.

Still another object of the invention is to provide this locking element in the contact area between the planetary shaft of each planet and its housing.

Figure 4A:
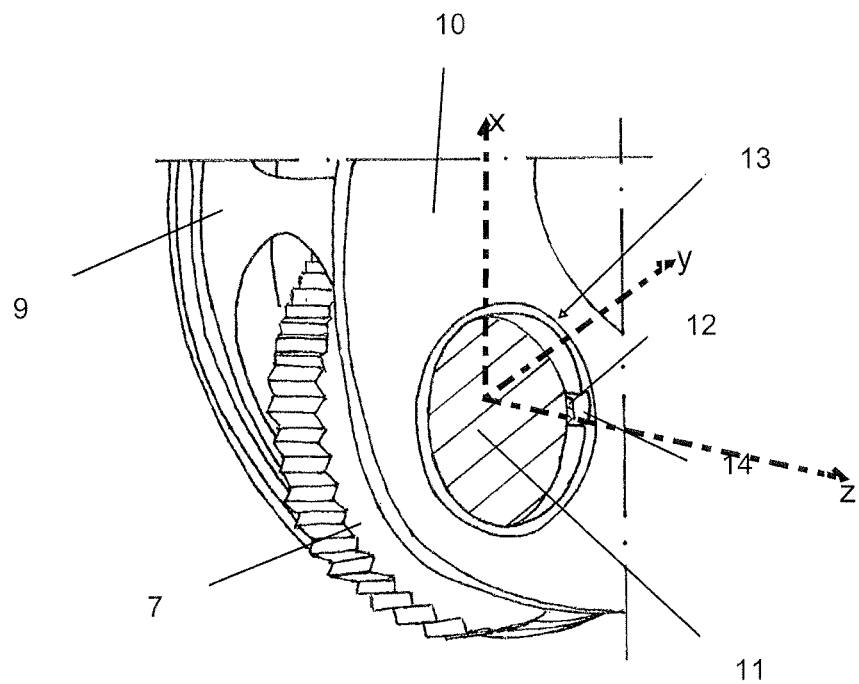

to FIG. 4A shows a perspective section of the planetary shaft equipped with the locking element in the housing of the bogie plate integrated in the planetary carrier according to an embodiment of the invention.

Figure 4B:
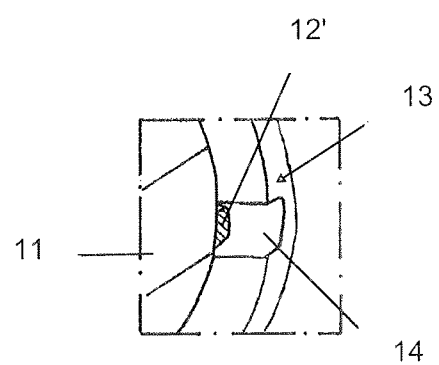

FIG. 4B shows a detailed perspective coming from the preceding figure.

Figure 5:
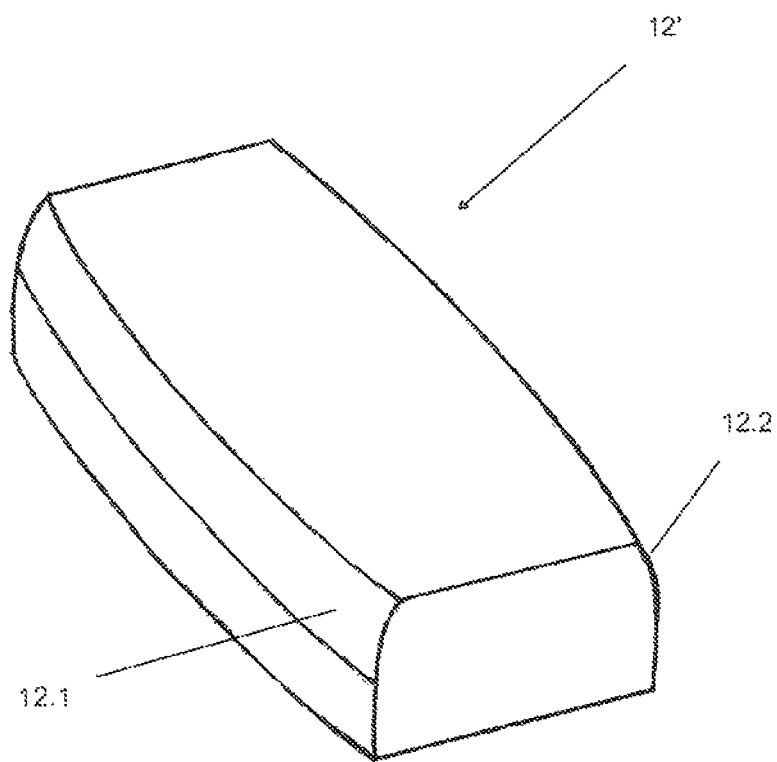

FIG. 5 provides a perspective of the bogie plate key according to the invention.

DESCRIPTION OF THE PREFERENTIAL EXECUTION

Figure 1:
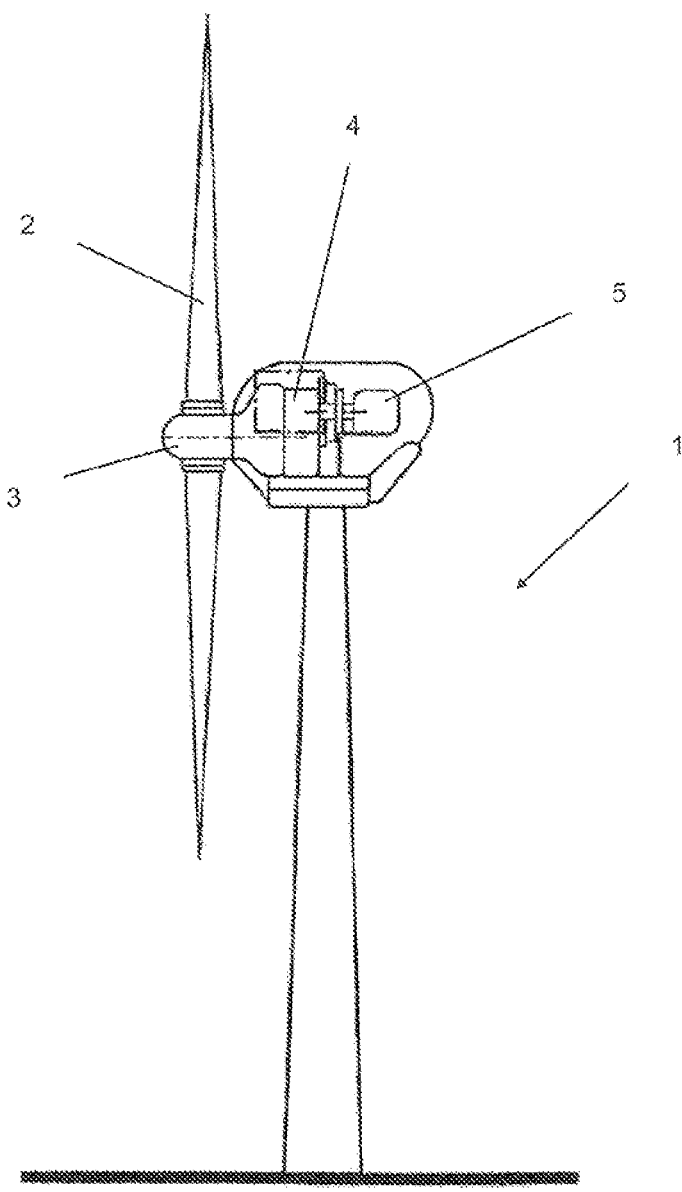
FIG. 1 shows a schematic representation of a wind turbine equipped with a planetary type gearbox, as per the invention.

As shown in FIG. 1, a wind turbine (1) comprises a gearbox (4) that acts by transmitting the torque of the blades (2) of the rotor and the rotor hub (3) to an electric generator (5).

Figure 2:
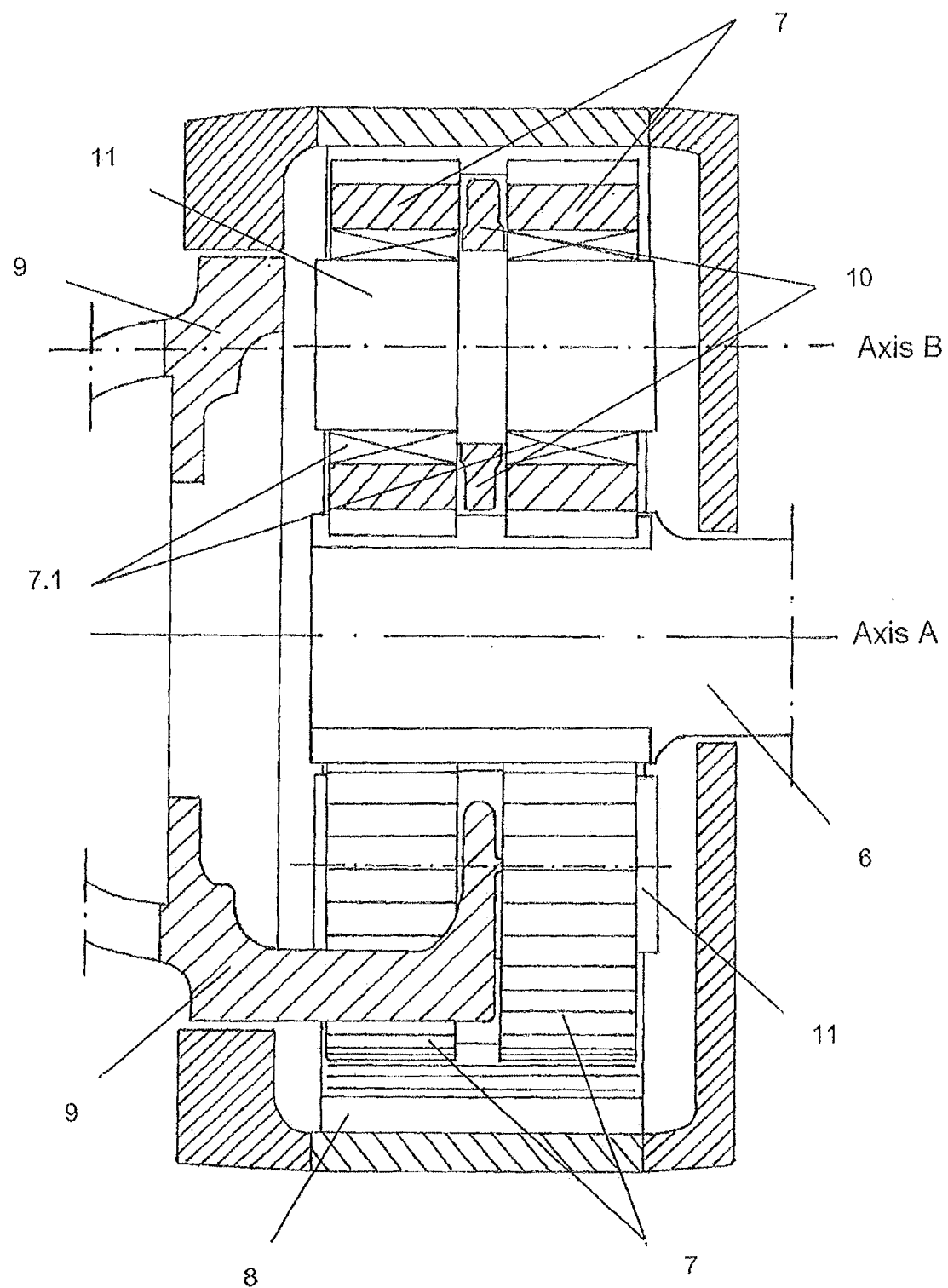
FIG. 2 provides a cross-section view of part of a gearbox transmission according to the invention.

The planetary type gearbox (4), having at least one sun wheel (6) or axis A, around which rotate and engage one or more planets (7), which in turn engage in a ring wheel (8) and are supported by a planetary carrier (9) rotating in relation to the central sun wheel (6) (see FIG. 2).

The planetary carrier (9) can be fastened or integrated into a bogie plate (10) so as to absorb planetary gearbox stage misalignments produced by the forces and deformations generated in the rotor hub (3), which, given the rigid connection between the hub (3) and the gearbox (4), directly affect it.

In turn, each pair of planets (7) together with their corresponding bearings (7.1) are installed on a planetary shaft (11) or axis B, located in a housing (13) on the bogie plate (10) of the planetary carrier (9), on which they turn for aligning and thus absorbing the mentioned forces and deformations (see FIG. 2).

As explained above, when there is little torque, each planetary shaft (11) rotates on its housing (13) around axis B, an axis perpendicular to the plane of the bogie plate (10) of the planetary carrier (9), causing grinding of this housing (13) and provoking damage to the gearbox (4).

According to an embodiment of the invention, the bogie plate (10), integrated or fastened to the planetary carrier (9), is equipped with a locking element (12) that prevents rotation of each planetary shaft (11) of each pair of planets (7) around axis B, a plane perpendicular to the bogie plate (10) and permits the rotation of each planetary shaft (11) with respect of the two axes coplanar with the plane of the bogie plate (10).

As shown in FIG. 4A, this locking element (12) is located in the contact area between each planetary shaft (11) and its housing (13) in the bogie plate (10), keeping each planetary shaft (11) from rotating and thus grinding in its housing (13) around axis B.

According to the preferred embodiment of the invention, this locking element (12) includes a key (12') in the contact area of each planetary shaft (11) with its housing (13) in the bogie plate (10) of the planetary carrier (9).

The fixation of said key (12') to the planetary shaft (11) can be carried out by fastening or slotting with interference, or both methods simultaneously, or by any other known method.

Figure 3:
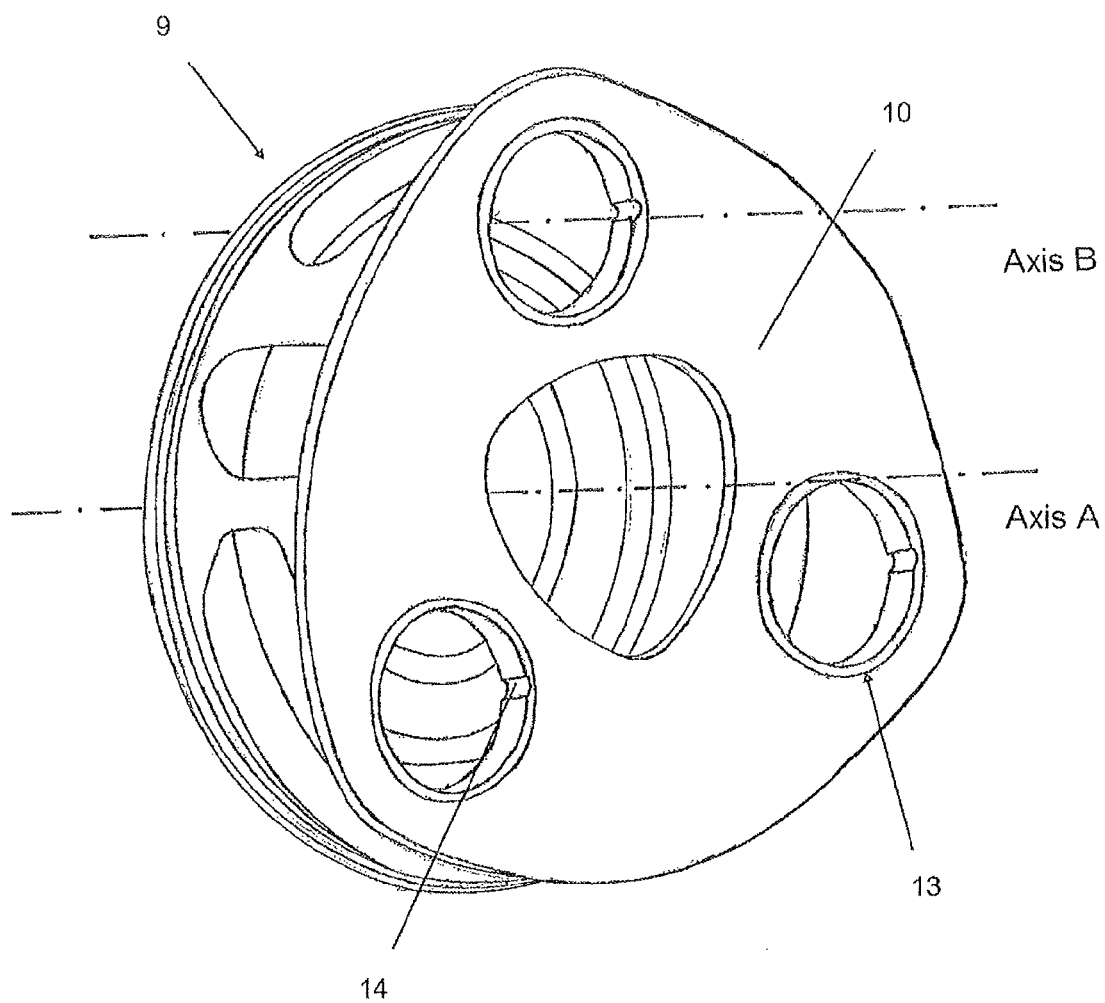
FIG. 3 shows a perspective view of an embodiment for a planetary carrier with bogie plate integrated according to the invention.

Nevertheless, as shown in FIG. 3, and further detailed in FIG. 4B, it is planned that the planetary carrier (9), and particularly the housing (13) of the bogie plate (10) for each pair of planets (7), be equipped with a keyseat (14) corresponding to the key (12') so that the planetary shaft (11) is kept from rotating around an axis perpendicular to the bogie plate (10) (hence collinear with the planetary shaft (11)) and absolutely free to rotate on the other two axes perpendicular to the previous one.

For this, the key (12') (see FIG. 5) is rounded on two of its sides (12.1 and 12.2), which are the faces in contact with the housing (13) of the planetary carrier (9).

The invention claimed is:

1. A bogie plate for a wind turbine,
   wherein the bogie plate couples to or is integral with a planetary carrier of a planetary-type gearbox,
   the gearbox having an input shaft that is connected directly to a rotor hub,
   wherein the gearbox comprises planets,
   each planet is installed with a bearing on a respective planetary shaft,
   each planetary shaft is located in a respective bogie plate housing, wherein each respective bogie plate housing comprises an open space in the bogie plate,
   wherein the planets engage a ring wheel and rotate around a sun wheel,
   wherein the gearbox comprises locking elements each comprising a key and a corresponding keyseat, wherein each key is fixated to each respective planetary shaft and each keyseat is located along the entire length of each respective bogie plate housing,
   wherein the locking elements prevent rotation of each respective planetary shaft relative to each respective bogie plate housing permitting absorption of deformations derived from the rotor hub of the wind turbine,
   each locking element being located in a contact area between each respective planetary shaft and each respective bogie plate housing such that each locking element abuts each respective bogie plate housing in the bogie plate.

2. The bogie plate according to claim 1, wherein each key is secured to each respective planetary shaft by bolt fastening.

3. The bogie plate according to claim 1, wherein each key is secured to each respective planetary shaft by slotting.

4. The bogie plate according to claim 1, wherein each key is secured to each respective planetary shaft by both bolted fastening and slotting.

5. The bogie plate according to claim 1, wherein each key is rounded on two sides so that each planetary shaft is capable of self-alignment in each respective bogie plate housing by rotating relative to the bogie plate.

* * * * *